United States Patent
Ichikawa

(10) Patent No.: US 8,242,627 B2
(45) Date of Patent: Aug. 14, 2012

(54) ELECTRICALLY POWERED VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 151 days.

(21) Appl. No.: 12/808,550

(22) PCT Filed: Jan. 21, 2009

(86) PCT No.: PCT/JP2009/050794
§ 371 (c)(1),
(2), (4) Date: Jun. 16, 2010

(87) PCT Pub. No.: WO2009/116311
PCT Pub. Date: Sep. 24, 2009

(65) Prior Publication Data
US 2011/0187184 A1   Aug. 4, 2011

(30) Foreign Application Priority Data

Mar. 17, 2008   (JP) .................................. 2008-068175

(51) Int. Cl.
*B60L 1/00* (2006.01)
(52) U.S. Cl. ............... 307/10.1; 320/109; 320/DIG. 34; 180/65.29; 180/65.265; 180/65.285; 903/907; 903/902
(58) Field of Classification Search ................. 307/10.1; 320/109, DIG. 34; 180/65.29, 65.265, 65.285; 903/907, 902
See application file for complete search history.

(56) References Cited

U.S. PATENT DOCUMENTS

| | | | | |
|---|---|---|---|---|
| 5,926,004 | A | * | 7/1999 | Henze .......................... 320/109 |
| 6,741,065 | B1 | | 5/2004 | Ishii et al. |
| 7,595,607 | B2 | * | 9/2009 | Lambert et al. ............... 320/106 |
| 2009/0001926 | A1 | | 1/2009 | Sato |

FOREIGN PATENT DOCUMENTS

| | | |
|---|---|---|
| JP | A-8-98324 | 4/1996 |
| JP | A-2000-299988 | 10/2000 |
| JP | A-2001-45673 | 2/2001 |
| JP | A-2001-163041 | 6/2001 |
| JP | A-2007-195336 | 8/2007 |
| JP | A-2007-228753 | 9/2007 |

OTHER PUBLICATIONS

International Search Report mailed on May 12, 2009 in corresponding International Application No. PCT/JP2009/050794 (with translation).

* cited by examiner

*Primary Examiner* — Patrick Salce
(74) *Attorney, Agent, or Firm* — Oliff & Berridge, PLC

(57) ABSTRACT

A path for charging a main battery from an external power source is established by turning on a first relay and a second relay. This charging path is provided independently of an electric path between a motor generator for generating a vehicle driving force and the main battery established by turning on a third relay. Further, an auxiliary load system including an auxiliary battery is not connected to the above-mentioned electric path, but receives operating power through a power line between the second relay and a power converter so as to be operable even with the third relay turned off.

20 Claims, 7 Drawing Sheets

| | RELAY | | | | AUXILIARY MACHINERY TO BE TURNED ON |
|---|---|---|---|---|---|
| | 150A | 150B | 150C | 150D | |
| DURING EXTERNAL CHARGING | ON | ON | OFF | ON (IG-ON) OFF (IG-OFF) | BATTERY ECU AC/DC CONVERTER DC/DC CONVERTER |
| WHILE VEHICLE IS RUNNING (IG-ON) | OFF | ON | ON | ON | EACH ECU EACH DEVICE |

ELECTRICALLY POWERED VEHICLE

TECHNICAL FIELD

The present invention relates to an electrically powered vehicle, and more particularly to an electrical system of an electrically powered vehicle having mounted thereon a power storage device that can be charged from a power source external to the vehicle.

BACKGROUND ART

For electrically powered vehicles, such as electric vehicles or hybrid vehicles, in which an electric motor for driving the vehicle is driven by electric power from a power storage device represented by a secondary battery, a configuration of charging this power storage device from a power source external to the vehicle (hereinafter briefly referred to as "an external power source" as well) has been proposed. Hereinafter, charging of the power storage device from the external power source will be referred to as "external charging" as well.

For example, Japanese Patent Laying-Open No. 2001-163041 (Patent Document 1) discloses a configuration in which AC power obtained through a connector connectable to an external commercial power source is rectified and smoothed, and then boosted to a predetermined voltage, to thereby charge an axle driving battery. Further, Patent Document 1 discloses that a vehicle air conditioner which allows a compressor constituting a refrigerating cycle to be driven using electric charges stored in the battery is provided with a circuit that, in an ordinary state, electrically drives the compressor in the refrigerating cycle with electric power from the battery, and in the case of air-conditioning inside the vehicle being parked at a camp site or the like, disconnects the battery from a compressor driving circuit so that electric power obtained from the AC power source, then rectified and smoothed can be used directly for driving the compressor.

Accordingly, the vehicle air conditioner disclosed in Patent Document 1 can be operated for a long period of time with no concern for battery exhaustion or without continuing operating the engine during parking at a camp site or the like.

Japanese Patent Laying-Open No. 2000-299988 (Patent Document 2) discloses a commercial power source apparatus for a vehicle configured such that an outlet is automatically switchable between an inverter and a commercial power source. According to the configuration of Patent Document 2, one of AC power received from the commercial power source and AC voltage output from the inverter upon converting electric power from the battery can be selectively connected by a switch to a power outlet common to the commercial power source and the inverter.

Japanese Patent Laying-Open No. 2001-45673 (Patent Document 3) discloses a circuit configuration for an electrically driven apparatus and a battery unit thereof in which individual switches are provided in a path for charging the battery unit from a commercial power source and charging means and in an electric path from the battery unit to load driving means, respectively.

Patent Document 1: Japanese Patent Laying-Open No. 2001-163041
Patent Document 2: Japanese Patent Laying-Open No. 2000-299988
Patent Document 3: Japanese Patent Laying-Open No. 2001-45673

DISCLOSURE OF THE INVENTION

Problems to be Solved by the Invention

However, according to the configuration disclosed in Patent Document 1, a single switch (SW1) executes switching between the path for charging a battery (B1) from the external power source (commercial power source) and the path for supplying electric power of the battery to a traction motor. Since this switch, through which an electric current supplied from the battery to the traction motor passes, needs to have a relatively large capacity, it is expected that driving power for connecting contacts will be increased. Therefore, the configuration disclosed in Patent Document 1 requiring a B-side contact to be connected by the switch during external charging raises a concern for degraded efficiency during charging.

According to Patent Document 1, air-conditioning equipment including a compressor (13) can also be operated during external charging by connecting the contacts by another switch (SW2) different from the above-mentioned switch. As such, an auxiliary load system of such a vehicle in some cases needs to be operated according to a user's request during external charging. In such a case, an electrical system is required to have a configuration for ensuring an operation of such an auxiliary load system while achieving improved charging efficiency, however, Patent Documents 2 and 3 never mention such a configuration of an auxiliary load system.

The present invention has been made to solve the above problems. An object of the present invention is to provide, in an electrically powered vehicle having mounted thereon a power storage device that can be charged from an external power source, a configuration of an electrical system that, during external charging, achieves improved charging efficiency and also ensures an operation of an auxiliary load system.

Means for Solving the Problems

The present invention is directed to an electrically powered vehicle having mounted thereon a power storage device that can be charged from an external power source. The electrically powered vehicle includes a charging connector, a power converter, a power control unit, first and second switches, and an auxiliary load system. The charging connector receives supplied electric power from the external power source during external charging of charging the power storage device from the external power source. The power converter converts the supplied electric power from the external power source into charging power for the power storage device. The power control unit is configured to be connected between the power storage device and an electric motor for generating a vehicle driving force to control driving of the electric motor. The first switch is interposed into and connected to an electric path between the charging connector and the power converter. The second switch is interposed into and connected to an electric path between the power converter and the power storage device. The auxiliary load system is arranged to receive electric power through a first line electrically connecting the second switch and the power converter.

According to the above-described electrically powered vehicle, closing the first and second switches can ensure the electric path connecting the power storage device, the auxiliary load system and the external power source, independently of the electric path from the external power source to the electric motor for generating a vehicle driving force through the power control unit. Herein, the first and second switches, which are not arranged in the electric path to the electric motor for generating a vehicle driving force, can be limited in current capacities. Accordingly, the auxiliary load system can be operated while achieving improved charging efficiency by reducing power consumption of the switches (i.e., the first and second switches) during the external charging.

Preferably, the electrically powered vehicle further includes a third switch interposed into and connected to an electric path between the power storage device and the power control unit, and a control unit. The control unit, during the external charging, closes the first switch and the second switch while opening the third switch, and activates the power converter to charge the power storage device.

Accordingly, the external charging is executed with the third switch opened, which has a current capacity larger than those of the first and second switches and which is provided on the electric path to the electric motor for generating a vehicle driving force. Therefore, power consumption of the switches during the external charging can be reduced, which results in improved charging efficiency.

More preferably, the control unit opens the second switch in response to a completion of charging of the power storage device during the external charging.

Accordingly, unnecessary power consumption can be reduced by opening the switch (second switch) constituting the external charging path in response to the completion of charging of the power storage device, and the auxiliary load system can be operated by electric power supplied from the external power source through the first switch.

More preferably, the auxiliary load system includes an auxiliary power storage device having an output voltage lower than the output voltage of the power storage device, an auxiliary power converter for converting electric power on the first line into charging power for the auxiliary power storage device, and a load device operated with electric power received from the auxiliary power storage device.

Accordingly, the auxiliary power storage device (auxiliary battery) can be charged with electric power from the external power source during the external charging.

Alternatively, preferably, the electrically powered vehicle further includes a control unit. The control unit, during the external charging, activates the auxiliary power converter to charge the auxiliary power storage device, and shuts down the auxiliary power converter in response to a completion of charging of the auxiliary power storage device.

Accordingly, shutdown of the operation of the auxiliary power converter during the external charging in response to the completion of charging of the auxiliary power storage device can reduce unnecessary power consumption.

More preferably, the external power source is a system power supply, and the electrically powered vehicle further includes an outlet and a control unit. The outlet outputs AC power equivalent to power of the system power source to be drawn through a second line electrically connecting the first switch and the power converter. A fourth switch is connected to an electric path between the second line and the outlet. The control unit closes the fourth switch when activation of an electrical system of the electrically powered vehicle is instructed during the external charging.

Accordingly, AC power from the system power source can be drawn through the outlet provided in the electrically powered vehicle during the external charging. This can reduce power consumption of the power storage device.

Still preferably, the power converter is configured to be capable of bidirectionally converting electric power to convert electric power from the power storage device into the AC power. When the external power source suffers from a power failure while the fourth switch is closed, the control unit activates the power converter so that the AC power obtained by conversion is output to the second line.

Accordingly, when the external power source suffers from a power failure during the external charging, AC power equivalent to power of the system power source can be output through the outlet using electric power of the power storage device.

Preferably, a plurality of the power storage devices are provided, and a plurality of the second switches and a plurality of the first lines are provided in correspondence with the plurality of the power storage devices, respectively. The auxiliary load system is arranged to receive electric power from at least one of the plurality of the first lines. More preferably, the electrically powered vehicle further includes a plurality of third switches interposed into and connected to electric paths between the plurality of the power storage devices and the power control unit, respectively, and a control unit. The control unit, during the external charging, closes the first switch and at least one of the second switches while opening each of the third switches, and activates the power converter to charge at least one of the plurality of the power storage devices. Further, in response to a completion of charging of each of the power storage devices during the external charging, the control unit opens a corresponding one of the second switches.

Accordingly, in the electrical system provided with a plurality of power storage devices, the auxiliary load system can be operated while achieving improved charging efficiency by reducing power consumption of the switches (i.e., the first and second switches) during the external charging. Further, unnecessary power consumption can be reduced by opening a corresponding one of the second switches in response to the completion of charging of each of the power storage devices.

Preferably, the electrically powered vehicle further includes a third switch interposed into and connected to the electric path between the power storage device and the power control unit, a third line and a fourth line. The third line electrically connects the third switch and the power control unit. The fourth line electrically connects the first line and the third line. Alternatively, in the configuration provided with a plurality of power storage devices, the electrically powered vehicle further includes the third line and the fourth line. The third line electrically connects a plurality of third switches corresponding to the plurality of power storage devices, respectively, to the power control unit. The fourth line electrically connects at least one of the plurality of the first lines that supplies the electric power to the auxiliary load system, to the third line.

This allows the auxiliary load system to be operated with electric power from the power storage device, even with the second switch being turned off. Accordingly, opening the second switch during a normal running mode can reduce power consumption, which results in improved fuel consumption. Moreover, in the case where a failure occurs in the power storage device, the operation of the auxiliary load system can be ensured with regenerative electric power from the electric motor for driving the vehicle, even when the storage device is disconnected from the electrical system by opening the second and third switches.

Effects of the Invention

The electrically powered vehicle according to the present invention can achieve improved charging efficiency and also ensure an operation of the auxiliary load system during charging of the power storage device from the external power source.

Figure 1:
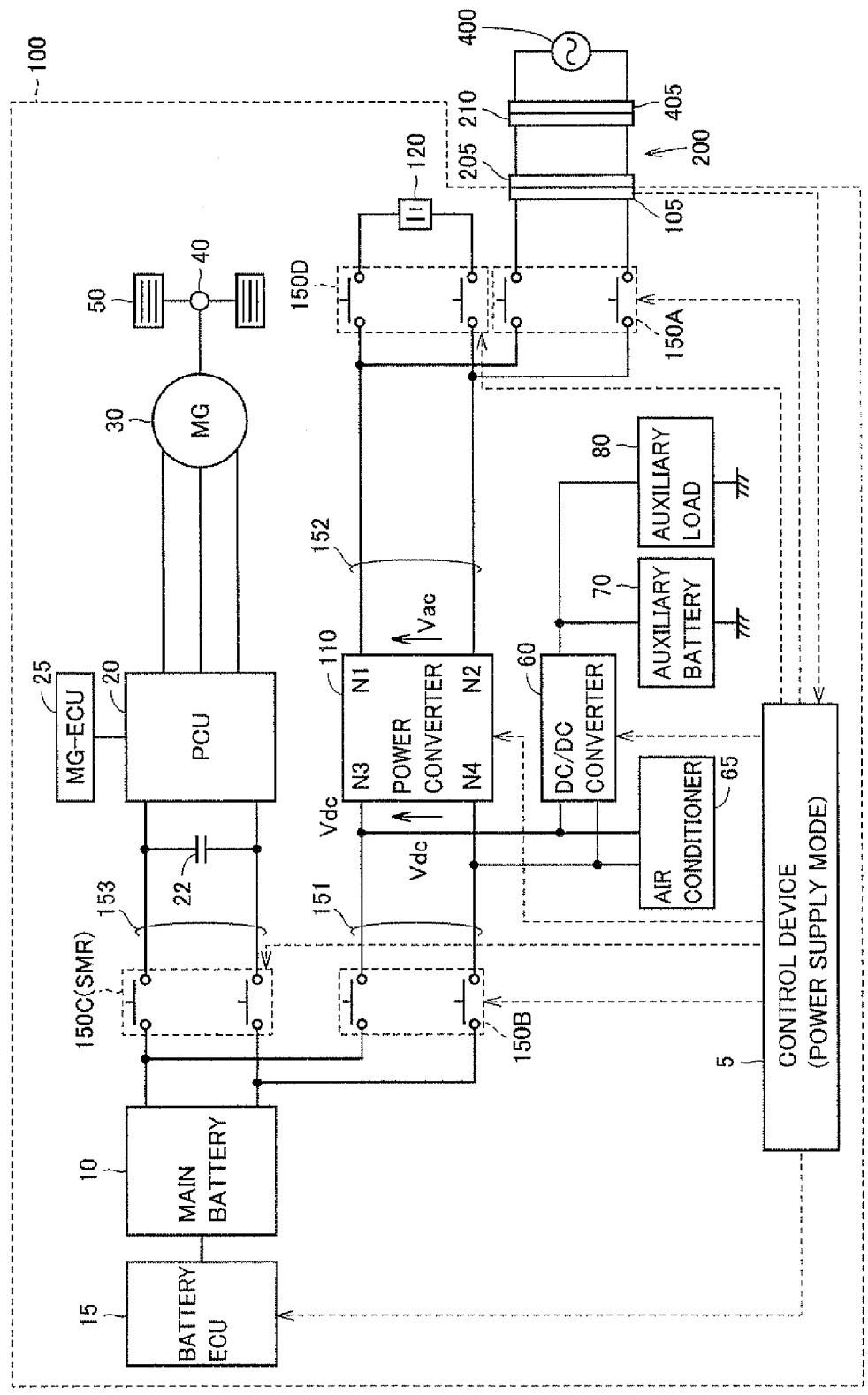
FIG. 1 is a block diagram showing a configuration of an electrical system of an electrically powered vehicle according to a first embodiment of the present invention.

DESCRIPTION OF THE REFERENCE SIGNS 5 control device; 10, 10(1)-10(n) main battery; 15, 15(1)-15(n) battery ECU; 22 smoothing capacitor; 25 MG-ECU; 30 motor generator; 40 power transmission gear; 50 driven wheel; 60 DC/DC converter; 65 air conditioner; 70 auxiliary battery; 80 auxiliary load; 100 electrically powered vehicle; 105 charging connector; 110 power converter; 112, 114, 116 bridge circuit; 115 transformer; 117, 118 power line; 120 AC outlet (on-board); 150A, 150B, 150B(1)-150B(n), 150C, 150C(1)-150C(n), 150D relay; 151-154 power line; 200 charging cable; 205 charging connector; 210 charging plug; 400 external power source; 405 outlet; 500 solar cell; C1 smoothing capacitor; L1, L2 reactor; N1, N2 node (AC side); N3, N4 node (DC side); Vac AC voltage; Vdc DC voltage.

BEST MODES FOR CARRYING OUT THE INVENTION

Hereinafter, embodiments of the present invention will be described in detail with reference to the drawings. In the following, the same or corresponding portions have the same reference characters allotted, and detailed description thereof will not be repeated.

First Embodiment

FIG. 1 is a block diagram showing a configuration of an electrical system of an electrically powered vehicle according to a first embodiment of the present invention.

With reference to FIG. 1, an electrically powered vehicle 100 includes a control device 5, a main battery 10, a power control unit (PCU) 20, a smoothing capacitor 22, a motor generator 30, a power transmission gear 40, and a driven wheel 50.

Control device 5 shall represent a functional portion for controlling turning on (closing)/off (opening) of each relay and activation (power on)/shutdown (power off) of each device, among functions of controlling devices mounted on electrically powered vehicle 100. It should be noted that control device 5 can be configured to fulfill the above functions by a predetermined arithmetic operation performed by execution of a program previously stored in a built-in memory not shown or a predetermined arithmetic operation performed by hardware such as an electronic circuit.

Main battery 10 is shown as a typical example of "a power storage device", and is typically implemented by a lithium ion, nickel-metal hydride or similar secondary battery. For example, an output voltage of main battery 10 is approximately 200V. Alternatively, the "power storage device" may be implemented by an electric double-layer capacitor, a combination of a secondary battery and a capacitor, or the like.

PCU 20 converts stored electric power of main battery 10 into electric power for controlling and driving of motor generator 30. For example, motor generator 30 is implemented by a permanent-magnet type three-phase synchronous electric motor, and PCU 20 is implemented by a three-phase inverter. Alternatively, PCU 20 may be implemented by a combination of a converter that variably controls the output voltage of main battery 10 and a three-phase inverter that converts the output voltage of the converter into an AC voltage.

A relay 150C corresponding to a "third switch" is connected to an electric path between main battery 10 and PCU 20. Relay 150C corresponds to a system main relay (SMR) to be turned on in response to a command of activating an electrical system of electrically powered vehicle 100, for example, turning on of an ignition switch (IG-ON). Main battery 10 is connected to a power line 153 of PCU 20 with relay 150C interposed therebetween. Smoothing capacitor 22 is connected to power line 153 to serve to smooth a DC voltage.

Output torque of motor generator 30 is transmitted to driven wheel 50 via power transmission gear 40 including reduction gears and a power split mechanism, to cause electrically powered vehicle 100 to run.

Motor generator 30 is capable of generating electric power by rotational force of driven wheel 50 in a regenerative braking mode of electrically powered vehicle 100. The generated electric power is converted by PCU 20 into charging power for main battery 10

In a hybrid vehicle having an engine (not shown) mounted thereon in addition to motor generator 30, this engine and motor generator 30 are operated cooperatively, so that a required vehicle driving force for electrically powered vehicle 100 is generated. At this stage, main battery 10 can also be charged using electric power generated by rotation of the engine. That is, electrically powered vehicle 100 represents a vehicle having an electric motor for generating a vehicle driving force, and includes a hybrid vehicle generating a vehicle driving force by the engine and the electric motor, an electric vehicle with no engine mounted, a fuel cell vehicle, and the like.

Electronic control units (ECUs) are provided for main battery 10 and PCU 20 for managing and controlling their operations, respectively. For example, a battery ECU 15 is provided for main battery 10, and an MG-ECU 25 is provided for PCU 20.

Battery ECU 15 manages and controls a charge/discharge state of the main battery based on a temperature sensor, a current sensor, a voltage sensor and the like, all of which are not shown but provided for main battery 10. Typically, battery ECU 15 calculates a remaining capacity (SOC: State of Charge) of main battery 10.

MG-ECU 25 controls a power conversion operation at PCU 20, specifically, an on/off operation of power semiconductor switching devices constituting the above-mentioned inverter (not shown) or the inverter and a converter (not shown) such that motor generator 30 is operated according to an operation command (typically, a torque command value).

Electrically powered vehicle 100 includes a charging connector 105 and a power converter 110 as a configuration for external charging of main battery 10 (power storage device). Further, electrically powered vehicle 100 is provided with an AC outlet 120 for drawing power from a commercial power source.

Charging connector 105 is connected to an external power source 400 via a charging cable 200. External power source 400 is typically implemented by a system power supply. Charging cable 200 is configured to have a charging connector 205 and a charging plug 210.

In external charging, an outlet 405 of external power source 400 is connected to charging plug 210, and charging connector 205 is connected to charging connector 105 of electrically powered vehicle 100, so that electric power from external power source 400 is supplied to charging connector 205.

When electrically connected to external power source 400, charging connector 105 has a function of informing it to control device 5.

Power converter 110 executes a power conversion between an AC voltage Vac across nodes N1 and N2 and a DC voltage Vdc across nodes N3 and N4. Nodes N1 and N2 of power converter 110 are connected to a power line 152. Power line 152 is electrically connected to charging connector 105 with a relay 150A corresponding to "a first switch" interposed therebetween. Further, power line 152 is electrically connected to AC outlet 120 with a relay 150D corresponding to "a fourth switch" interposed therebetween.

Nodes N3 and N4 of power converter 110 are connected to a power line 151. Further, power line 151 is electrically connected to main battery 10 with a relay 150B corresponding to "a second switch" interposed therebetween.

Each of relays 150A to 150D is typically implemented by an electromagnetic relay that is closed (turned on) by connecting contacts when applying an exciting current, and opened (turned off) by disconnecting the contacts when not applying an exciting current. An electric current passing through relay 150C to be transmitted between motor generator 30 for driving the vehicle and main battery 10 is larger than the electric current passing through relays 150A and 150B during external charging and the electric current, passing through relay 150D to be output through AC outlet 110. Accordingly, relay 150C has a larger current capacity than those of the remaining relays 150A, 150B and 150D, and the electric current passing through an exciting coil in the on state is also larger. Therefore, consumption power of relay 150C in the on state is also larger than that of the remaining relays 150A, 150B and 150D.

Electrically powered vehicle 100 further includes an auxiliary load system supplied with electric power (DC voltage Vdc) through power line 151. The auxiliary load system includes a DC/DC converter 60, an air conditioner 65, an auxiliary battery 70, and an auxiliary load 80.

Air conditioner 65 has an inverter (not shown) for converting DC voltage Vdc on power line 151 into AC power for controlling and driving of a compressor (not shown). An output voltage of auxiliary battery 70 is lower than that of main battery 10 (e.g., approximately 12V). Auxiliary load 80 generically represents devices operated with electric power supplied from auxiliary battery 70, and includes audio equipment and compact motors. Each of ECUs as well as control device 5 is also operated with electric power supplied from auxiliary battery 70.

DC/DC converter 60 down-converts DC voltage Vdc on power line 151, namely, the output voltage of main battery 10, into a charging voltage for auxiliary battery 70.

Power converter 110 is configured such that, during external charging, AC voltage Vac from external power source 400 transmitted across nodes N1 and N2 is converted into DC voltage Vdc for output across nodes N3 and N4. DC voltage Vdc corresponds to the output voltage of main battery 10.

Preferably, power converter 110 is further configured to have a function of converting DC voltage Vdc across nodes N3 and N4 into AC voltage Vac for output through AC outlet 120. Accordingly, power converter 110 shall be configured to allow bidirectional DC/AC voltage conversions.

Figures 2, 3:
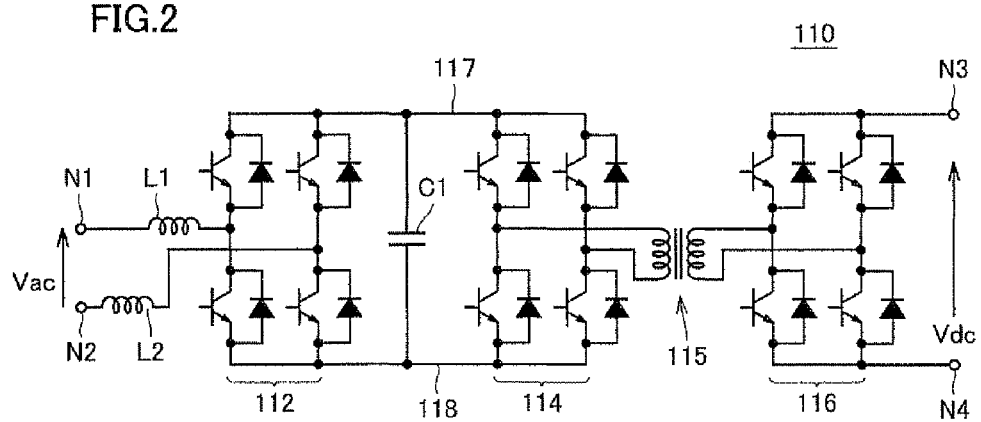
FIG. 2 is a circuit diagram showing an example configuration of a power converter shown in FIG. 1.
FIG. 3 is a diagram explaining on/off control of each relay in the electrical system of an electrically powered vehicle shown in FIG. 1.

FIG. 2 is a circuit diagram showing an example configuration of power converter 110.

With reference to FIG. 2, power converter 110 includes a reactor L1 connected in series to node N1, a reactor L2 connected in series to node N2, a smoothing capacitor C1, bridge circuits 112, 114, 116, and a transformer 115.

Bridge circuit 112 controls on/off states of power semiconductor switching devices to convert AC voltage Vac across nodes N1 and N2 into a DC voltage for output across power lines 117 and 118. Smoothing capacitor C1 is connected between power lines 117 and 118.

Bridge circuit 112 controls the on/off states of the power semiconductor switching devices to convert the DC voltage across power lines 117 and 118 into AC power for output to the primary side of transformer 115. Transformer 115 performs a voltage conversion of the AC voltage at the primary side according to a predetermined primary/secondary turns ratio for output to the secondary side.

Bridge circuit 116 controls the on/off states of power semiconductor switching devices to convert an AC voltage at the secondary side of transformer 115 into a DC voltage, and output the converted DC voltage Vdc across nodes N3 and N4.

Accordingly, an AC/DC conversion operation of converting AC voltage Vac (e.g., 100 VAC) from external power source 400 into DC voltage Vdc for charging main battery 10 can be executed while ensuring insulation between external power source 400 and main battery 10.

Alternatively, power converter 110 is also operable in the reverse direction to the above-described AC/DC conversion operation to convert DC voltage Vdc across nodes N3 and N4 into AC voltage Vac for output across nodes N1 and N2.

In this DC/AC conversion operation, bridge circuit 116 converts DC voltage Vdc across nodes N3 and N4 into an AC voltage for output to transformer 115. Bridge circuit 114 then converts the AC voltage transmitted from transformer 115 into a DC voltage for output across power lines 117 and 118. Bridge circuit 112 then converts the DC voltage across power lines 117 and 118 into AC voltage Vac equivalent to power of the system power source for output across nodes N1 and N2.

Since a well-known technique is applicable to the on/off control of the power semiconductor switching devices for the AC/DC conversion or the DC/AC conversion performed at bridge circuits 112, 114 and 116, detailed description will not be made herein.

With reference to FIGS. 3 and 1, the on/off control of each relay in the electrical system of an electrically powered vehicle shown in FIG. 1 will now be described.

With reference to FIG. 3, while the vehicle is running, the electrical system of electrically powered vehicle 100 is activated by turning on the ignition switch (IG-ON). In this state, relay 150A is turned off, while each of relays 150B to 150D is turned on.

With reference to FIG. 1, while the vehicle is running, turning on relay 150C corresponding to the system main relay allows electric power to be transmitted between main battery 10 and motor generator 30, so that driving of motor generator 30 can be controlled according to stored electric power of main battery 10. This allows a vehicle driving force to be generated with electric power of main battery 10 using motor generator 30, and allows main battery 10 to be charged with regenerative electric power generated by motor generator 30.

Turning on relay 150B electrically connects power line 151 to which the auxiliary load system is connected, to main battery 10. This allows the auxiliary load system to be supplied with electric power from main battery 10. Further, by turning on relay 150D, the DC voltage of main battery 10 can be converted by power converter 110 into AC voltage Vac for output through AC outlet 120. Control device 5 powers on each of ECUs and each of devices mounted on the vehicle.

Since external charging is not executed while the vehicle is running, relay 150A is turned off.

Referring again to FIG. 3, during external charging when external power source 400 is connected to charging connector 105, relays 150A and 150B are turned on, and relay 150C is turned off. Relay 150D is controlled to be opened/closed according to whether the ignition switch instructing the activation of the electrical system is turned on by a user.

Referring again to FIG. 1, turning on relays 150A and 150B during external charging allows an electric path to be established along which electric power supplied from external power source 400 (AC voltage Vac) is converted by power converter 110 into DC power (DC voltage Vdc) for supply to main battery 10. Accordingly, external charging of main battery 10 can be performed.

Further, turning on relay 150A also allows the auxiliary load system connected to power line 151 to be operated with DC voltage Vdc obtained by converting the electric power supplied from external power source 400. More specifically, connecting the auxiliary load system to power line 151, rather than power line 153 connected to relay 150C corresponding to the system main relay, allows operating power to be supplied to the auxiliary load system, even when relay 150C is turned off. In the auxiliary load system, charging power for auxiliary battery 70 and operating power for auxiliary load 80 can be supplied from DC/DC converter 60.

Accordingly, during external charging, charging of main battery 10 and power supply to the auxiliary load system can be achieved even when relay 150C having a relatively large capacity so as to transmit electric power corresponding to the vehicle driving force is turned off. That is, relay 150C can be turned off during external charging, which results in improved charging efficiency.

Relay 150D is turned off when the electrical system is not activated by the user, and turned on when the electrical system is activated (IG-ON). This allows AC power to be drawn through AC outlet 120 when the electrical system is activated by the user. Since relays 150A and 150D are both turned on during external charging, AC voltage Vac supplied from external power source 400 can be drawn through AC outlet 120, basically without using electric power of main battery 10. Main battery 10 can be charged immediately during external charging in this respect as well.

During external charging, control device 5 powers on merely ECUs and devices necessary for external charging, without activating the whole electrical system. More specifically, battery ECU 15, power converter 110 and DC/DC converter 60 are powered on, while the remaining devices are basically turned off. Merely activating the minimum devices necessary for external charging achieves more improved charging efficiency.

It should be noted that even during external charging, each ECU and each device are powered on when the ignition switch is operated by the user to activate the electrical system (IG-ON).

Herein, in the configuration of FIG. 1, relays 150A to 150D correspond to the "first switch" to the "fourth switch", respectively, as described above. Power lines 151 to 153 correspond to the "first line" to the "third line", respectively. DC/DC converter 60 corresponds to the "auxiliary power converter", and auxiliary battery 70 corresponds to the "auxiliary power storage device".

Figure 4:
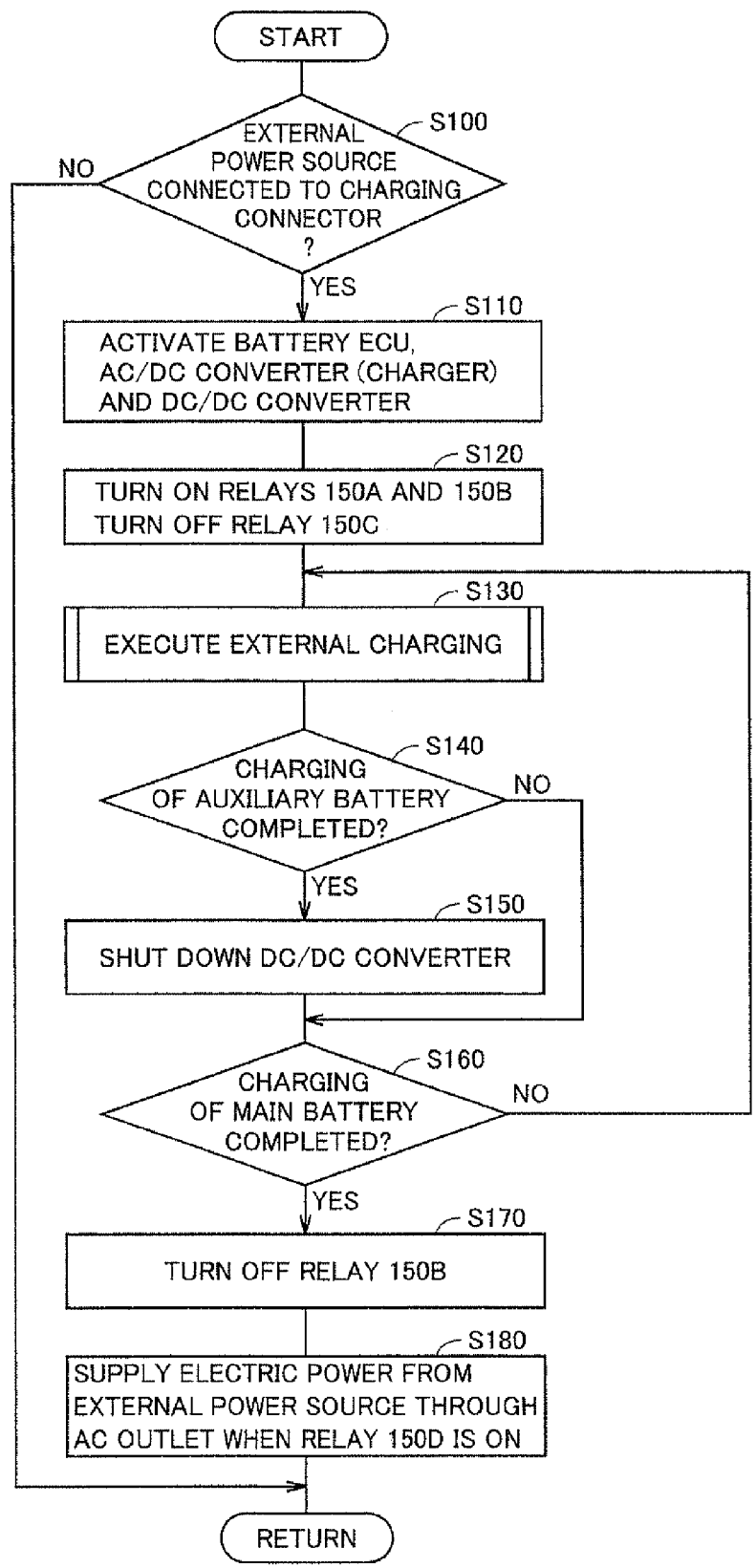
FIG. 4 is a first flow chart explaining a relay control operation during external charging in the electrical system of an electrically powered vehicle shown in FIG. 1.
Figure 5:
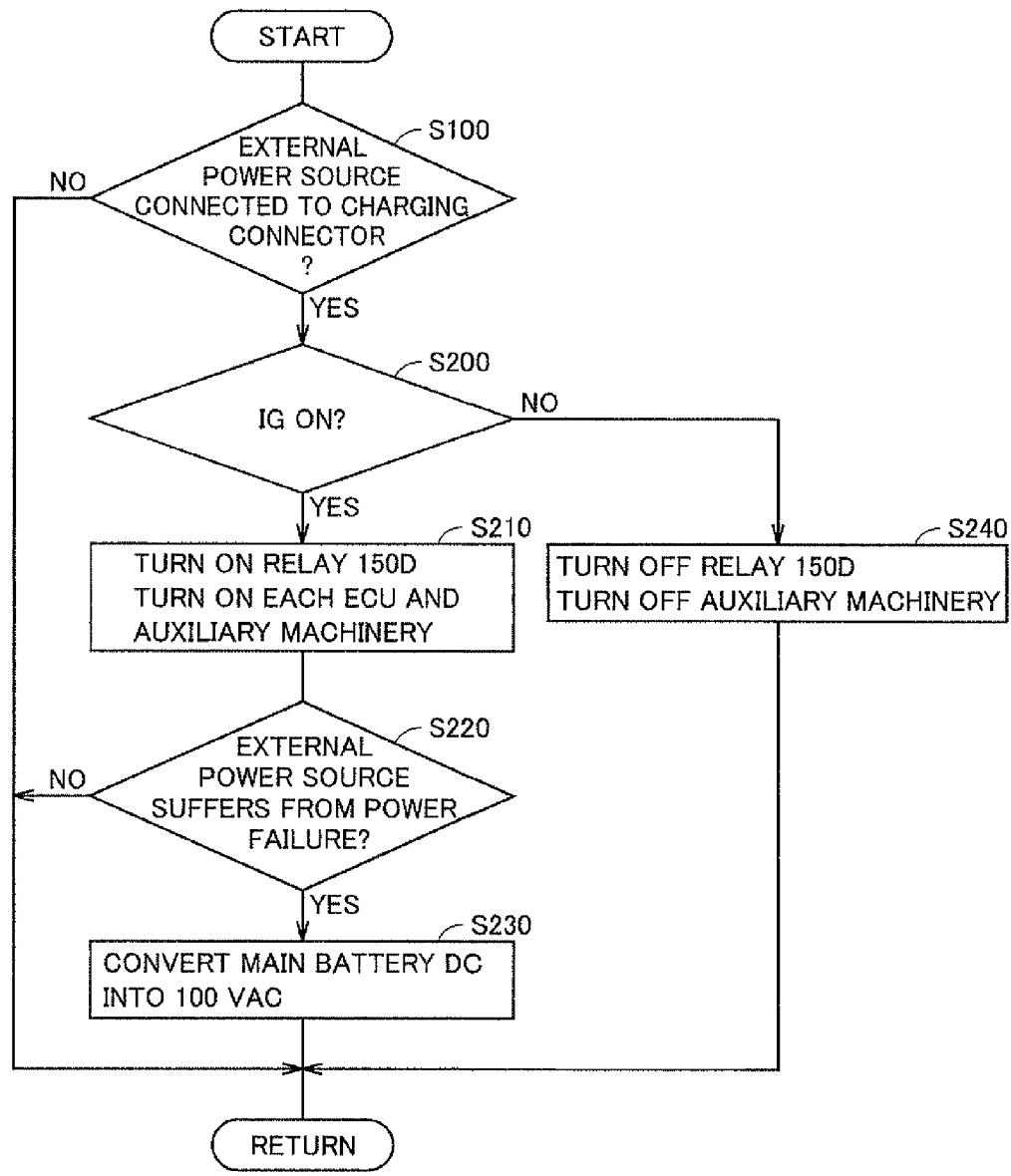
FIG. 5 is a second flow chart explaining a relay control operation during external charging in the electrical system of an electrically powered vehicle shown in FIG. 1.

With reference to FIGS. 4 and 5, a relay control operation during external charging in the electrical system of an electrically powered vehicle shown in FIG. 1 will now be described. The control operations shown in FIGS. 4 and 5 are achieved by, for example, execution of previously stored programs by control device 5.

FIG. 4 shows an operation procedure relating to the control of relays 150A to 150C.

With reference to FIG. 4, control device 5 determines in step S100 if external power source 400 is connected to charging connector 105. For example, charging cable 200 is provided with a circuit that outputs an electric signal indicating that electric power is being received from external power source 400. By configuring such that the above-mentioned electric signal is transmitted from the circuit to control device 5 when charging cable 200 is connected to charging connector 105, the determination in step S100 can be executed depending on the presence/absence of the electric signal.

When external power source 400 is connected to charging connector 105 (when determined YES in step S100), control device 5 identifies that external charging is to be executed, and proceeds into step S110. In step S110, control device 5 activates battery ECU 15, power converter 110 for external charging and DC/DC converter 60, which are the minimum devices necessary for external charging.

Further, in step S120, control device 5 turns on relays 150A and 150B, and turns off relay 150C. In step S130, external charging is executed by controlling power converter 110 such that AC voltage Vac from external power source 400 is converted into DC voltage Vdc for charging main battery 10 along the electric path established by turning on relays 150A and 150B.

Control device 5 proceeds into step S140 when external charging is executed, to determine if charging of auxiliary battery 70 has been completed. When charging of auxiliary battery 70 has been completed (when determined YES in step S140), control device 5 proceeds into step S150 to shut down DC/DC converter 60. This can prevent DC/DC converter 60 from consuming unnecessary electric power after the completion of charging of auxiliary battery 70.

When charging of auxiliary battery 70 has not been completed (when determined NO in step S140), step S150 is skipped, so that the operation of DC/DC converter 60 is maintained.

Further, in step S160, control device 5 determines if charging of main battery 10 has been completed. For example, the determination in step S160 can be executed based on the SOC of main battery 10 managed by battery ECU 15. When charging of the main battery has been completed (when determined YES in step S160), control device 5 proceeds into step S170 to turn off relay 150B. Accordingly, turning off relay 150B when charging of main battery 10 is completed can prevent unnecessary power consumption by relay 150B that would be caused by maintaining the charging path that is no longer necessary.

At this stage, when relay 150D is turned on, control device 5 allows in step S180 electric power from external power source 400 to be drawn through AC outlet 120 passing through relays 150A and 150D, even after turning off relay 150B.

When charging of main battery 10 has not been completed (when determined NO in step S160), the process is returned to step S130, so that external charging is continued. More specifically, during external charging when the external power source is connected to charging connector 105, the on state of relay 150B established in step S120 is maintained until charging of main battery 10 is completed. DC/DC converter 60 activated in step S110 is operated until charging of auxiliary battery 70 is completed.

FIG. 5 shows an operation procedure of control device 5 relating to the control of relay 150D.

With reference to FIG. 5, during external charging (when determined YES in step S100), control device 5 determines in step S200 if the ignition switch (IG) has been turned on by the user.

When IG is off (when determined NO in step S200), control device 5 turns off relay 150D in step S240 merely for executing external charging. Auxiliary machinery such as audio equipment is also powered off, so that auxiliary battery 70 can be charged immediately from DC/DC converter 60. Moreover, reducing consumption power of the auxiliary load system allows external charging to be executed with high efficiency.

When IG is on, that is, when the electrical system is activated (when determined YES in step S200), control device 5 in step S210 turns on relay 150D, and powers on each of ECUs and each device of the auxiliary machinery. Further, control device 5 proceeds into step S220 to determine if external power source 400 suffers from a power failure. For example, the determination in step S220 can be executed by providing charging connector 105 or the like with a zero cross detector (not shown).

When external power source 400 suffers from a power failure (when determined YES in step S220), control device 5 proceeds into step S230 to generate a control instruction such that DC power from main battery 10 is converted by power converter 110 into AC power equivalent to power of the system power source. This allows AC voltage Vac output to power line 152 to be drawn through AC outlet 120 via relay 150D.

When external power source 400 does not suffer from a power failure (when determined NO in step S220), step S220 is skipped, so that the DC/AC conversion operation by power converter 110 is not executed. Then, by turning on relays 150A and 150B, AC power from external power source 400 is drawn through AC outlet 120 without consuming electric power of main battery 10.

In this manner, the receipt of AC power through AC outlet 120 can be executed/stopped according to whether or not the electrical system has been activated by the user (IG on/off).

As described above, according to the electrical system of an electrically powered vehicle of the first embodiment of the present invention, during external charging, the path for charging main battery 10 with electric power supplied from external power source 400 can be established by turning on relays 150A and 150B while relay 150C having a large capacity which would establish the electric path to the electric motor (motor generator 30) for generating a vehicle driving force is turned off, and electric power can be supplied to power line 151 to which the auxiliary load system is connected. Therefore, during external charging, consumption power of the relays (switches) can be reduced to achieve improved charging efficiency, while ensuring the operation of the auxiliary load system.

Second Embodiment

Figure 6:
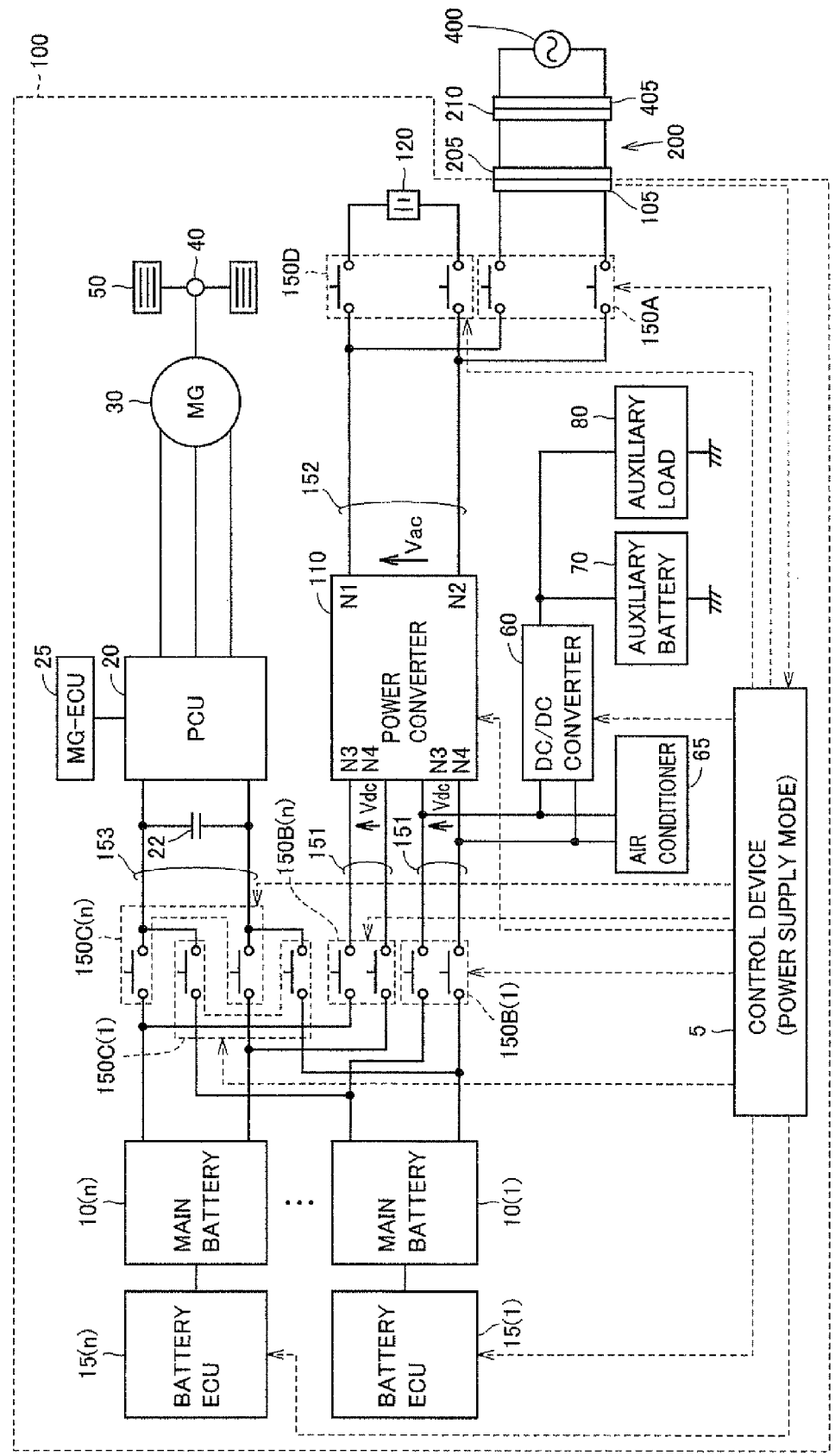
FIG. 6 is a block diagram showing a configuration of an electrical system of an electrically powered vehicle according to a second embodiment of the present invention.

FIG. 6 is a block diagram showing a configuration of an electrical system of an electrically powered vehicle according to a second embodiment of the present invention.

Comparing FIG. 6 with FIG. 1, the electrical system of an electrically powered vehicle according to the second embodiment differs from that of the first embodiment in that a plurality of main batteries 10(1) to 10(n) are provided. Herein, n is an integer greater than or equal to 2. For battery ECU, battery ECUs 15(1) to 15(n) are provided individually for managing the remaining capacities of main batteries 10(1) to 10(n), respectively.

In the configuration provided with a plurality of main batteries 10, individual relays 150C(1) to 150C(n) are provided between main batteries 10(1) to 10(n) and power line 153, respectively, and controlled to be turned on/off independently. Each of relays 150C(1) to 150C(n) is turned on basically when the electrical system is activated.

Individual relays 150B(1) to 150B(n) corresponding to main batteries 10(1) to 10(n), respectively, are also provided between power converter 110 and main batteries 10(1) to 10(n). Relays 150B(1) to 150B(n) are also controlled to be turned on/off independently.

Power converter 110 has a pair of nodes N3 and N4 shown in FIG. 2 independently in correspondence with each of main batteries 10(1) to 10(n). For example, the configuration shown in FIG. 6 can be obtained by arranging n secondary-side (bridge circuit 116 side) windings of transformer 115 and n bridge circuits 116 in parallel in correspondence with the number of main batteries 10 in the configuration shown in FIG. 2. In this case, independently controlling switching of n bridge circuits 116 allows DC voltage Vdc corresponding to each of main batteries 10(1) to 10(n) to be controlled independently.

Accordingly, power lines 151 are also provided independently for main batteries 10(1) to 10(n), respectively. The auxiliary load system including DC/DC converter 60, air conditioner 65, auxiliary battery 70, and auxiliary load 80 is connected to at least one of these n power lines 151.

The on/off control of a plurality of relays 150B and 150C in the electrical system shown in FIG. 6 will now be described.

During external charging, after turning on each of relays 150B(1) to 150B(n), relays 150B(1) to 150B(n) are controlled to be turned off independently according to the state of charge of main batteries 10(1) to 10(n), that is, in a manner that steps S160 and S170 shown in FIG. 4 are executed independently for each of main batteries 10. However, one of relays 150B corresponding to one of power lines 151 that is connected to the auxiliary load system needs to be maintained in the on state at least until charging of auxiliary battery 70 is completed, even when charging of a corresponding one of main batteries 10 is completed.

Each of relays 150C(1) to 150C(n) is controlled similarly to relay 150C in the first embodiment.

While the vehicle is running, it is not necessary to turn on all of relays 150B(1) to 150B(n). Basically, merely one of relays 150B corresponding to one of power lines 151 that is connected to the auxiliary load system is turned on. In the case where some of power lines 151 are connected to the auxiliary load system, corresponding some of relays 150(B) may be switched on/off according to the state (e.g., SOC) of corresponding some of main batteries 10.

Alternatively, in order to draw electric power through AC outlet 120, it may be configured that some of relays 150(B) are turned on for some limited batteries having large remaining capacities (SOC) among main batteries 10(1) to 10(n).

While the vehicle is running and during external charging, a main battery 10(i) in which a failure has occurred can be disconnected from the electrical system by turning off corresponding relays 150B(i) and 150C(i).

The remaining configuration and control of the electrical system are similar to those of the first embodiment, and detailed description will not be repeated.

The electrical system of an electrically powered vehicle according to the second embodiment achieves similar effects to those of the electrical system of an electrically powered vehicle according to the first embodiment, with the configuration in which a plurality of main batteries are arranged in parallel.

Third Embodiment

Figure 7:
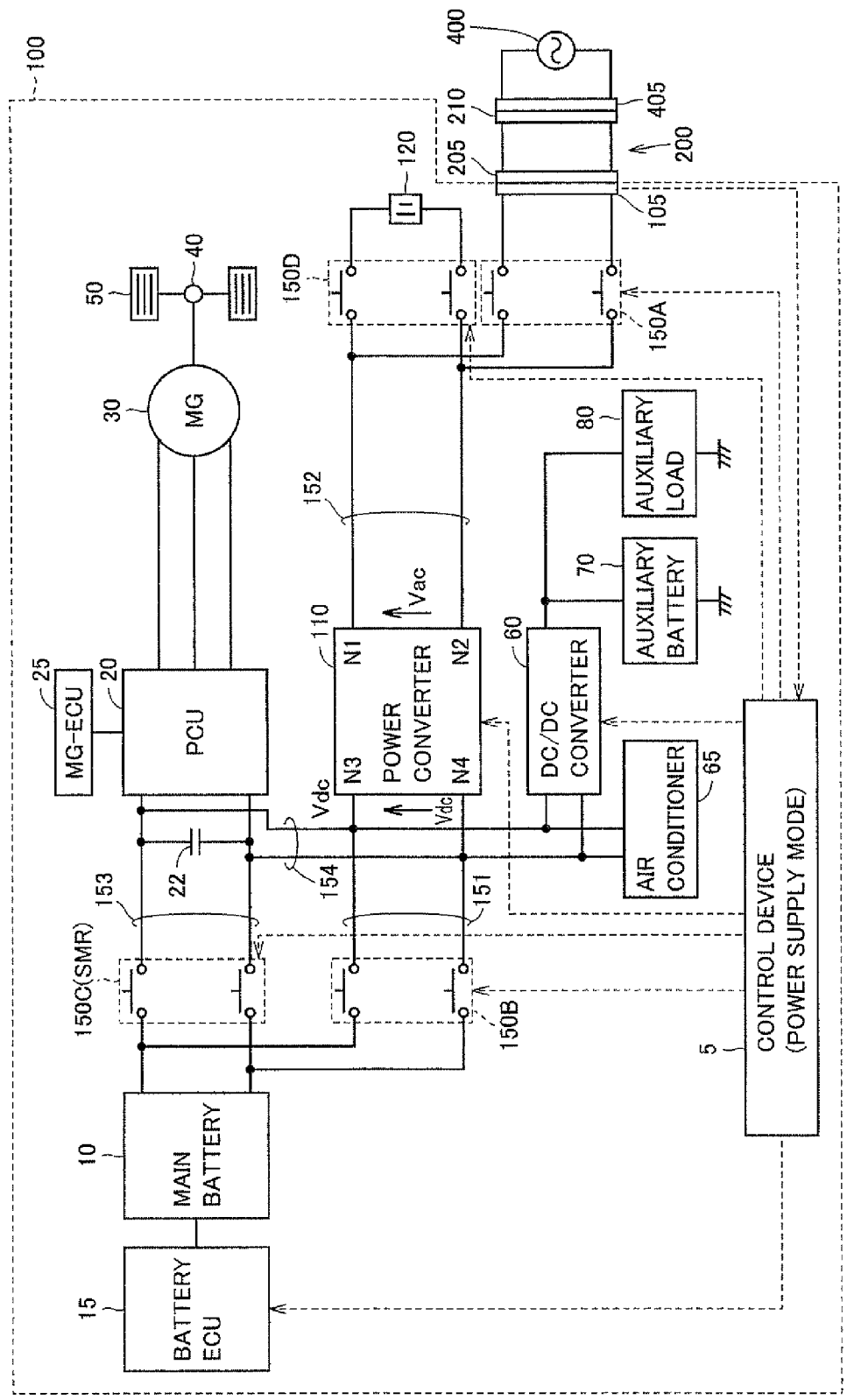
FIG. 7 is a block diagram explaining a configuration of an electrical system of an electrically powered vehicle according to a third embodiment of the present invention.

FIG. 7 is a block diagram showing a configuration of an electrical system of an electrically powered vehicle according to a third embodiment of the present invention.

Comparing FIG. 7 with FIG. 1, the electrical system of an electrically powered vehicle according to the third embodiment differs from the configuration of the first embodiment in that a power line 154 corresponding to "a fourth line" for electrically connecting power lines 151 and 153 is further provided. The remaining configuration and control of each relay are similar to those shown in FIG. 1, and detailed description will not be repeated.

With the configuration of the electrical system shown in FIG. 1 not provided with power line 154, the power supply path to the auxiliary load system connected to power line 151 is interrupted when an open fault occurs in relay 150B while the vehicle is running. The same applies to the case where a failure occurs in main battery 10, which brings about the need to turn off relays 150B and 150C.

In these cases, electrically powered vehicle 100 will be brought into a limp-home mode, however, there is a concern that the inability to ensure the power supply path to auxiliary battery 70 as described above causes a voltage drop at auxiliary battery 70, resulting in insufficient power supply to each ECU, which raises a problem in ensuring a limp-home distance.

In contrast, with the configuration of the electrical system according to the third embodiment shown in FIG. 7, providing power line 154 allows the auxiliary load system including DC/DC converter 60 to be supplied with electric power from main battery 10 via relay 150C even with relay 150B turned off. Accordingly, relay 150B can always be turned off during a normal running mode of the vehicle, which can reduce consumption power of the relays to achieve improved fuel efficiency.

Moreover, the auxiliary load system including DC/DC converter 60 can be supplied with electric power by regenerative electric power from motor generator 30 even when relays 150B and 150C are turned off due to a failure occurred in main battery 10 while the vehicle is running, or when an open fault occurs in relay 150B while the vehicle is running. It is therefore expected that a relatively longer limp-home distance can be ensured than in the configuration of FIG. 1.

It should be noted that, with the configuration shown in FIG. 7, electric charges are stored in smoothing capacitor 22 at the termination of external charging. Accordingly, it is preferable to temporarily activate MG-ECU 25 in response to the termination of external charging (e.g., disconnection of charging cable 200) to operate PCU 20 such that the stored electric power of smoothing capacitor 22 is consumed by PCU 20 and motor generator 30 as reactive power. For example, motor generator 30 is controlled so as to have a zero output torque to cause an electric current to pass through the coil windings of motor generator 30, so that the stored electric power of smoothing capacitor 22 can be consumed.

[Modification of Third Embodiment]

Figure 8:
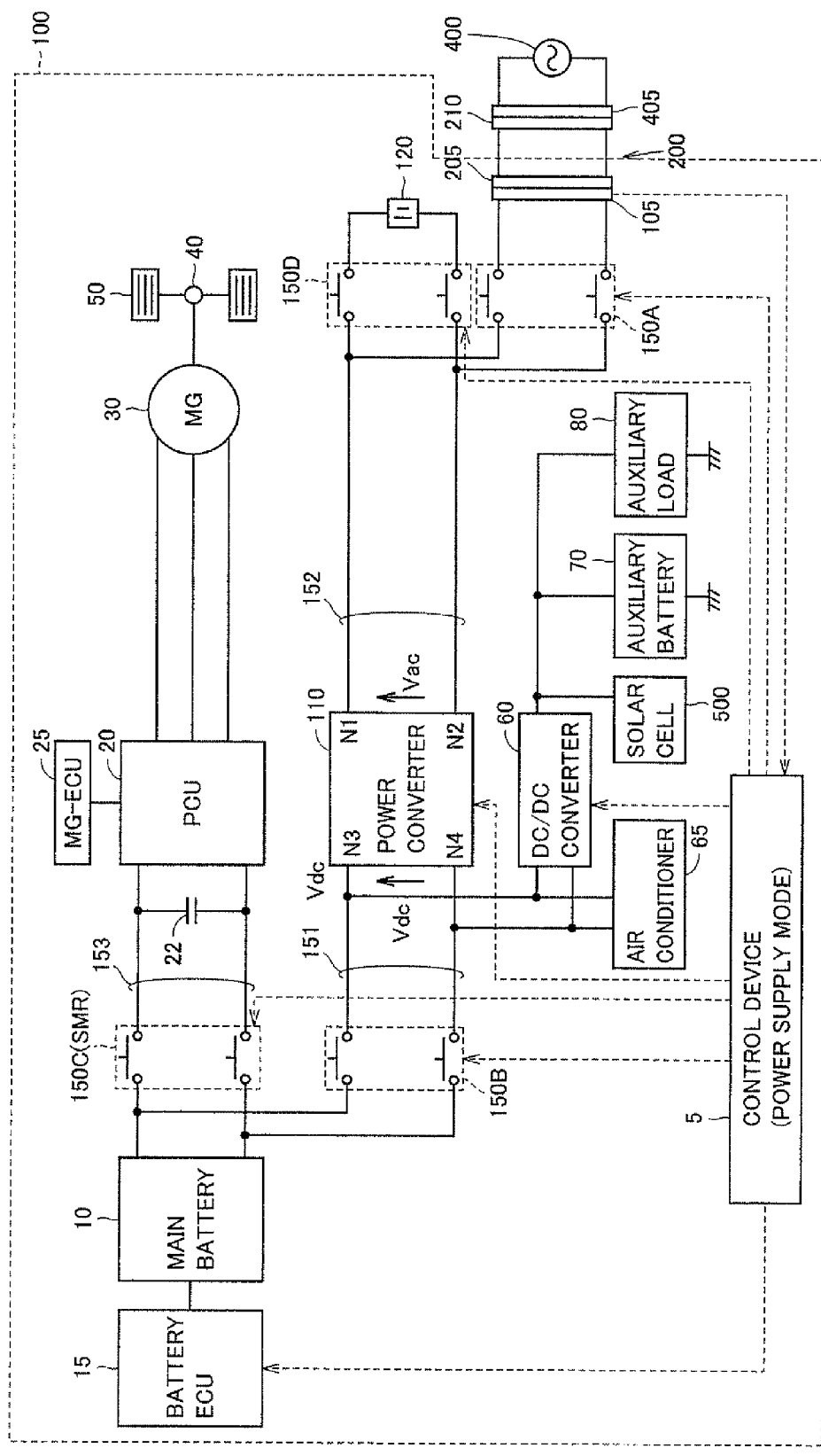
FIG. 8 is a block diagram explaining a configuration of an electrical system of an electrically powered vehicle according to a modification of the third embodiment of the present invention.

FIG. 8 is a block diagram explaining a configuration of an electrical system of an electrically powered vehicle according to a modification of the third embodiment of the present invention.

Comparing FIG. 8 with FIG. 1, the electrical system of an electrically powered vehicle according to the modification of the third embodiment differs from that of the first embodiment in that a solar cell 500 for charging auxiliary battery 70 is further provided.

Solar cell 500 is disposed at a position where sunlight can be received, such as the roof of electrically powered vehicle 100, to generate electric power according to the amount of received sunlight. This can ensure charging power for auxiliary battery 70, which can ensure an operating period of auxiliary load 80 (including each ECU) supplied with operating power from auxiliary battery 70, including the limp-home mode. It is also expected that, during external charging, reduction in the on-state period of relay 150B achieves improved charging efficiency.

The configurations of FIGS. 7 and 8 may be combined to add both of power line 154 and solar cell 500 to the configuration of FIG. 1. Alternatively, according to the configurations of FIGS. 7 and 8, power line 154 and/or solar cell 500 may be added to the configuration of FIG. 6 provided with a plurality of main batteries 10.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

INDUSTRIAL APPLICABILITY

The present invention is applicable to an electrically powered vehicle, such as an electric vehicle, a hybrid vehicle, and the like having mounted thereon a power storage device that can be charged from a power source external to the vehicle.

The invention claimed is:

1. An electrically powered vehicle having mounted thereon a power storage device that can be charged from an external power source, comprising:
   a charging connector for receiving supplied electric power from said external power source during external charging of charging said power storage device from said external power source;
   a power converter for converting the supplied electric power from said external power source into charging power for said power storage device;
   a power control unit connected between said power storage device and an electric motor for generating a vehicle driving force and configured to control driving of said electric motor;

a first switch interposed into and connected to an electric path between said charging connector and said power converter;

a second switch interposed into and connected to an electric path between said power converter and said power storage device; and an auxiliary load system arranged to receive electric power through a first line electrically connecting said second switch and said power converter.

2. The electrically powered vehicle according to claim 1, further comprising:

a third switch interposed into and connected to an electric path between said power storage device and said power control unit; and a control unit for, during said external charging, closing said first switch and said second switch while opening said third switch, and activating said power converter to charge said power storage device.

3. The electrically powered vehicle according to claim 2, wherein said control unit opens said second switch in response to a completion of charging of said power storage device during said external charging.

4. The electrically powered vehicle according to claim 1, wherein said auxiliary load system includes an auxiliary power storage device having an output voltage lower than the output voltage of said power storage device, an auxiliary power converter for converting electric power on said first line into charging power for said auxiliary power storage device, and a load device operated with electric power received from said auxiliary power storage device.

5. The electrically powered vehicle according to claim 4, further comprising a control unit for, during said external charging, activating said auxiliary power converter to charge said auxiliary power storage device, and shutting down said auxiliary power converter in response to a completion of charging of said auxiliary power storage device.

6. The electrically powered vehicle according to claim 1, wherein said external power source is a system power supply, said electrically powered vehicle further comprising:

an outlet for outputting AC power equivalent to power of said system power supply to be drawn through a second line electrically connecting said first switch and said power converter;

a fourth switch connected to an electric path between said second line and said outlet; and a control unit for closing said fourth switch when activation of an electrical system of said electrically powered vehicle is instructed during said external charging.

7. The electrically powered vehicle according to claim 6, wherein said power converter is configured to be capable of bidirectionally converting electric power to convert electric power from said power storage device into said AC power, and when said external power source suffers from a power failure while said fourth switch is closed, said control unit activates said power converter so that said AC power obtained by conversion is output to said second line.

8. The electrically powered vehicle according to claim 1, wherein a plurality of said power storage devices are provided, a plurality of said second switches and a plurality of said first lines are provided in correspondence with the plurality of said power storage devices, respectively, and said auxiliary load system is arranged to receive electric power from at least one of the plurality of said first lines.

9. The electrically powered vehicle according to claim 8, further comprising:

a plurality of third switches interposed into and connected to electric paths between the plurality of said power storage devices and said power control unit, respectively; and a control unit for, during said external charging, closing said first switch and at least one of said second switches while opening each of said third switches, and activating said power converter to charge at least one of the plurality of said power storage devices.

10. The electrically powered vehicle according to claim 9, wherein in response to a completion of charging of each of said power storage devices during said external charging, said control unit opens a corresponding one of said second switches.

11. The electrically powered vehicle according to claim 1, further comprising:

a third switch interposed into and connected to the electric path between said power storage device and said power control unit;

a third line for electrically connecting said third switch and said power control unit; and a fourth line for electrically connecting said first line and said third line.

12. The electrically powered vehicle according to claim 2, further comprising:

a third line for electrically connecting said third switch and said power control unit; and a fourth line for electrically connecting said first line and said third line.

13. The electrically powered vehicle according to claim 8, further comprising:

a third line for electrically connecting said plurality of third switches and said power control unit, and a fourth line for electrically connecting at least one of the plurality of said first lines that supplies the electric power to said auxiliary load system, to said third line.

14. The electrically powered vehicle according to claim 4, further comprising:

a third switch interposed into and connected to the electric path between said power storage device and said power control unit;

a third line for electrically connecting said third switch and said power control unit; and a fourth line for electrically connecting said first line and said third line.

15. The electrically powered vehicle according to claim 5, further comprising:

a third switch interposed into and connected to the electric path between said power storage device and said power control unit;

a third line for electrically connecting said third switch and said power control unit; and a fourth line for electrically connecting said first line and said third line.

16. The electrically powered vehicle according to claim 6, further comprising:

a third switch interposed into and connected to the electric path between said power storage device and said power control unit;

a third line for electrically connecting said third switch and said power control unit; and a fourth line for electrically connecting said first line and said third line.

17. The electrically powered vehicle according to claim 7, further comprising:
 a third switch interposed into and connected to the electric path between said power storage device and said power control unit;
 a third line for electrically connecting said third switch and said power control unit; and
 a fourth line for electrically connecting said first line and said third line.

18. The electrically powered vehicle according to claim 3, further comprising:
 a third line for electrically connecting said third switch and said power control unit; and
 a fourth line for electrically connecting said first line and said third line.

19. The electrically powered vehicle according to claim 9, further comprising:
 a third line for electrically connecting said plurality of third switches and said power control unit; and
 a fourth line for electrically connecting at least one of the plurality of said first lines that supplies the electric power to said auxiliary load system, to said third line.

20. The electrically powered vehicle according to claim 10, further comprising:
 a third line for electrically connecting said plurality of third switches and said power control unit; and
 a fourth line for electrically connecting at least one of the plurality of said first lines that supplies the electric power to said auxiliary load system, to said third line.

\* \* \* \* \*